United States Patent [19]

Dysthe et al.

[11] 4,168,093
[45] Sep. 18, 1979

[54] VEHICLE TRAILER CONSTRUCTION

[75] Inventors: Sven I. Dysthe, Rykkin; Mads Gjerdrum, Larvik, both of Norway

[73] Assignee: Elkem-Spigerverket A/S, Oslo, Norway

[21] Appl. No.: 846,395

[22] Filed: Oct. 28, 1977

[51] Int. Cl.² .................. B60P 3/42; B62D 21/02
[52] U.S. Cl. ........................ 296/10; 296/35 A; 280/400
[58] Field of Search ............ 280/400, 47.12; 296/10, 296/35 A; 214/506; 298/2

[56] References Cited

U.S. PATENT DOCUMENTS

| 2,318,231 | 4/1943 | Katzman | 280/47.12 |
| 3,266,836 | 8/1966 | Taylor | 296/10 |
| 3,524,659 | 8/1970 | Filter | 296/10 |

FOREIGN PATENT DOCUMENTS 1040970  9/1966  United Kingdom ............... 280/400

*Primary Examiner*—John A. Pekar
*Attorney, Agent, or Firm*—Eyre, Mann, Lucas & Just

[57] ABSTRACT

A construction for a non-powered trailer to be towed by a motor vehicle is disclosed. A trailer frame is provided to which a plurality of different bodies can be affixed. In addition, the trailer is adaptable to be readily stored in a vertical position whereby storage space is substantially reduced.

5 Claims, 3 Drawing Figures

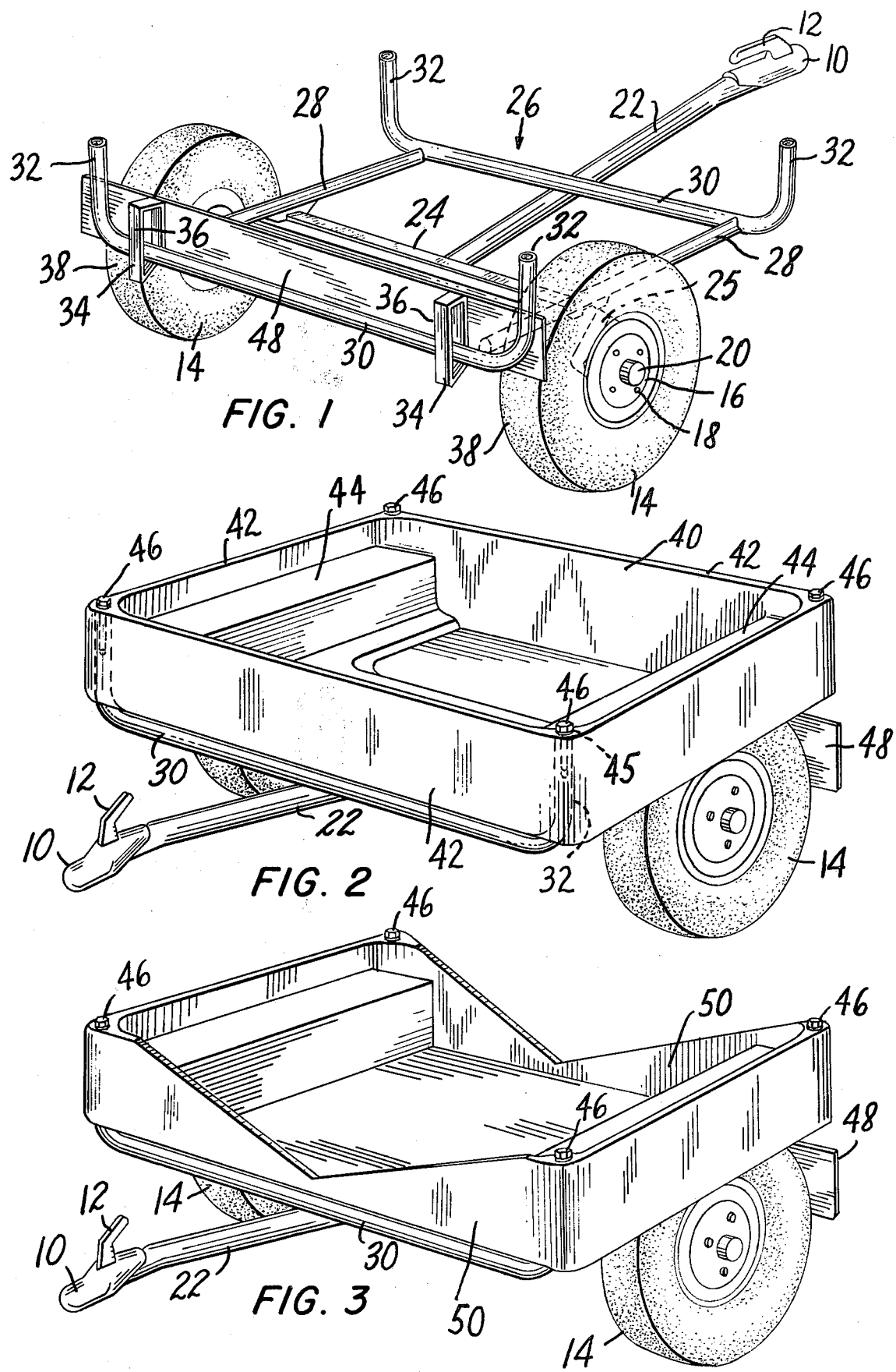

VEHICLE TRAILER CONSTRUCTION

The present invention relates to motor vehicles and more particularly to non-self-propelled trailers to be towed by a motor vehicle, such as an automobile.

More and more today people are on the move. As opposed to guided tours, moving vans, and boat rentals, the cost of these services has engendered in many people the predilection towards trailer camping, do-it-yourself moving, and owning ones' own boat, respectively. Because of this, the need for and use of trailers towed behind motor vehicles has increased substantially. However, there are certain inherent disadvantages in trailers which are currently available. In particular, separate trailers are normally required for camping, moving household belongings or other materials, moving a boat or the like. With the increase in value of real estate most people have trouble finding room for even one trailer, let alone a plurality of them. Since trailers are relatively long structures, even one trailer usually presents space problems, especially in urban areas or closely congested suburban areas.

The present invention overcomes much of the difficulties of known trailers by providing a trailer which cannot only be adapted to be multi-functional with little difficulty but can also be stored in a minimal amount of space. In accordance with the present invention, a trailer frame is provided with a plurality of interchangeable bodies. For example, the bodies may accomodate household belongings, living quarters, a boat or the like. Furthermore, the trailer frame is so constructed that it can be easily stored in a vertical position as opposed to the usual horizontal position.

These and other features of the present invention may be more fully understood with respect to the accompanying drawings wherein:

FIG. 1 is a trailer frame constructed in accordance with the present invention;

FIG. 2 shows the trailer frame of FIG. 1 with one selected body; and

FIG. 3 shows the frame of FIG. 1 with a second selected body.

As shown in FIG. 1 there is a trailer comprising a standard hitch 10 with a handle 12, a pair of wheels 14 attached to hubs 16 and bolts 18 which attach the hubs 16 to axles 20. The hitch is mounted on a superstructure comprising a main member 22 which is affixed to a cross-member 24. While only one of each is shown more than one of each can be employed if desired, e.g. an X-shape. Alternatively a part of the frame described hereinafter can be used for part of the superstructure if desired. Shock absorber arms 25 carrying the axles 20 are affixed to the cross-member 24.

Pursuant to the present invention, a frame 26 is attached to the described superstructure. The frame 26 includes elements 28 which run parallel to the main member 22 and elements 30 which run parallel to the cross-member 24. The elements 28 are affixed to the elements 30. As shown in the drawings, each of the elements 30 ends in an upwardly extending leg 32 which is at substantially 90° to elements 30 and, as a result, to the roadway (not shown) upon which the wheels 14 are intended to travel. The trailer bodies described hereinafter are adapted to fit over these upwardly extending legs.

The rear element 30 has affixed thereto members 34 which serve the dual function of acting as a bumper and as a member upon which the trailer can be rested in a vertical position, i.e. with elements 28 extending in a substantially vertical direction. For this purpose, members 34 are essentially planar on their rear surface 36 and the rear surface 36 is perpendicular to the axis of elements 28, i.e. they are essentially vertical to the road surface when the trailer is in operating position. The elements 36 are also of sufficient length to support a trailer in an upright position, typically at least about six (6) inches in length. In addition to the foregoing, the rear surfaces 36 are located only slightly behind the circumference 38 of wheels 14. Because of this particular construction, the trailer can be lifted up by handle 12 or by member 22 and will rotate about axles 20 until it is in an almost vertical position. Thereafter, because the rear surfaces 36 are positioned slightly behind the circumference 38 of the wheels 14, the trailer will come to rest on members 34 with the wheels slightly off the ground. In this way, the trailer can be stored in a vertical position so that it takes up a minimal amount of space. In fact, with the trend toward smaller cars which is prevalent today, the trailer could suitably be stored at the front end (i.e. the end opposite the door) of a garage designed for the large cars now in the process of being phased out. Furthermore, trailer dealers can stock far more inventory because of the vertical positioning. Trailer dealers are also aided by the interchangeability of bodies since they can stock a lesser number of frames than bodies and still have maximum flexibility.

Referring now to FIG. 2, there is shown one selected body 40 affixed to the frame 26 (not visible). In this particular instance, the body is suitable for carrying household furnishings, camping equipment or the like. The body is of molded plastic construction and includes sidewalls 42 as well as wheel wells 44 which can also serve as seats, shelves or the like as desired. The body 40 is provided with holes 45 so that it can be affixed to the frame 26 by means of hold-down members 46. The hold-down members 46 are attached to upwardly extending legs 32 of the frame (compare FIG. 1). The attachment of the body to the frame can be by means of friction elements, cooperating nuts and bolts, expansion bolts or the like as desired. It is to be noted that even with body 40 in position, the trailer can still be stored in a vertical position since the trailer does not extend beyond plate 48 to which members 34 are attached for structural rigidity.

Referring to FIG. 3, there is shown an alternative body for affixation to the frame. In this case, the body has V-shaped end walls 50 for receiving a boat. As with the embodiment of FIG. 2, the body of FIG. 3 is also easily attached to the frame by hold-down members 46. It will be appreciated that also with this construction the trailer together with body can be stored in a vertical position if desired.

Other forms for body construction will be readily appreciated by those skilled in the art. It will further be appreciated that other materials could be used for construction of the body although strong plastics such as polypropylene are recommended because of their lightness and impact resilience. Since various modifications will be apparent to those of ordinary skill in the art, it will be appreciated that the claims are intended to cover all changes and modifications of the preferred embodiments of the invention, herein chosen for the purpose of illustration which do not constitute departures from the spirit and scope of the invention.

What is claimed is:

1. In a non-powered trailer to be towed by a motor vehicle, of the type having a superstructure with first and second parallel wheels at opposite sides of said superstructure and a frame attached to the superstructure, wherein the improvement comprises:
   (a) said superstructure having a main longitudinal member connected to the center of a cross member at a first end and to a standard hitch at the second end;
   (b) said first and second opposed parallel wheels being connected to opposed ends of said cross member;
   (c) said frame having first and second parallel elements parallel to said longitudinal member and connected respectively to first and second ends of said cross member;
   (d) said frame further having first and second transverse elements rigidly connected to opposed ends of said first and second parallel elements and defining a rectangle within said first and second transverse elements and said first and second parallel elements;
   (e) first, second, third and fourth upwardly extending legs at opposed corners of said frame;
   (f) said first, second, third and fourth upwardly extending legs on said frame being operative for interchangeably receiving, positioning and supporting a plurality of trailer bodies; and
   (g) hold-down means on said upwardly extending legs for securing each of said trailer bodies to said trailer.

2. The trailer of claim 1 wherein said said hold-down means comprises threaded means in the ends of said upwardly extending legs and wherein said plurality of bodies each include holes in alignment with said threaded means.

3. The non-powered trailer recited in claim 1, further comprising:
   (a) said first transverse member being nearer said hitch;
   (b) first and second spaced apart combined bumpers and rests on said second transverse member, said first and second combined bumpers and rests having plane surfaces located rearward of the circumference of said first and second wheels, said plane surfaces being generally vertically disposed when said trailer is in its normal trailer position;
   (c) said combined bumpers and rests extending rearward beyond any of said plurality of trailer bodies; and
   (d) said combined bumpers and rests being operative to support said trailer in an upright stored position on a horizontal surface.

4. A non-powered trailer comprising:
   (a) a frame having two longitudinal members and front and rear transverse members;
   (b) a superstructure having a cross member attached at its ends to said two longitudinal members and being supported by first and second parallel wheels;
   (c) a main member attached at its first end to the center of said cross member and having its second end extending forward beyond said front transverse member;
   (d) a standard hitch on the second end of said main member;
   (e) first, second, third and fourth upwardly extending legs on opposed corners of said frame;
   (f) said first, second, third and fourth upwardly extending legs having means for positioning, supporting and holding a plurality of interchangeable trailer bodies;
   (g) first and second combined bumpers and rests rigidly connected to said rear transverse members;
   (h) said first and second combined bumpers and rests having vertically disposed planar rear surfaces thereon located rearward of the circumference of said first and second parallel wheels; and
   (i) said first and second combined bumpers and rests being operative as a bumper when the trailer is in use as a trailer and as a rest holding the trailer in the vertical position on a horizontal surface when the trailer is stored.

5. The trailer of claim 4 further comprising a plate connected between said first and second combined bumpers and rests.

* * * * *